United States Patent Office 3,026,306
Patented Mar. 20, 1962

3,026,306
PREPARATION OF AQUEOUS DISPERSIONS OF POLYMERS
Paul Halbig, Freiburg, Switzerland, assignor to Lonza Electric and Chemical Works Ltd., Basel, Switzerland
No Drawing. Filed Nov. 6, 1956, Ser. No. 620,599
2 Claims. (Cl. 260—86.3)

The invention relates to the preparation of aqueous dispersions of polymers, particularly of polyvinyl chloride and copolymers thereof.

It is known to prepare dispersions (latices) of polyvinyl chloride by stirring monomeric vinyl chloride in water containing emulsifiers and polymerization accelerators. In this way, latices are obtained, in which generally the average diameter of the polymer particles is smaller than .3 micron. The concentration of these latices can be increased to a content of about 40 to 60 percent of polymer, if a sufficient amount of emulsifier is used; mostly, the liquid to be polymerized contains more than 1 percent by weight of such emulsifiers.

For certain applications, polyvinyl chloride latices are desired which contain at least 40 percent of polymer, as little emulsifier as possible, and particles of a diameter exceeding .3 micron. A high polymer content has a favorable influence on the recovery of the polymer by evaporation; a low content of emulsifier presents advantages with respect to the water resistance of products made from the polymer. The chemical and physical properties of polymers obtained from latices of larger particles are generally superior to the properties of polymers produced from latices containing smaller particles.

Attempts to prepare polyvinyl chloride latices of the recited properties with small amounts of emulsifier (less than 1 percent of the polymer) have met with considerable difficulties because the thus prepared emulsions were so unstable as to break completely or partially already in the course of preparation.

My investigations have shown that these difficulties can be overcome by carrying out the polymerization and dispersion in the presence of small amounts of an organic liquid which is not polymerizable and insoluble or only difficultly soluble in water and which covers as a thin layer the aqueous solution during the reaction. Said organic liquid forming the surface layer must be specifically lighter than the aqueous solution and the latex prepared therefrom.

The organic coating liquid must further satisfy the requirement that it is not incorporated in the dispersion but remains wholly or substantially in the not emulsified state. Generally, the undesirable emulsification of the liquid organic additive can be prevented simply by using a very small amount of emulsifier; this procedure has the additional advantage to ensure the desired formation of larger polymer particles. About .1 to not more than 1 percent by weight, calculated on the weight of the vinyl chloride, of any conventional emulsifying agent can be used, such as ammonium stearate, sodium cetyl sulfate, Turkey red oil.

Suitable organic liquid additives are, for instance, paraffin oil, benzines, ethers such as dibutyl ether, esters such as dioctyl phthalate, and other liquids which have a lower specific gravity than the latex and which are difficultly slouble in water. I believe that the effect of the organic liquid additive may be essentially due to the formation of a surface layer floating on the latex, which layer causes "calming" of the latex surface and thus prevents breaking of the latex. However, it must be assumed that still other effects take place which cannot yet be satisfactorily explained.

The amount of the added organic liquid may be about 1 to 5 percent and more, calculated on the weight of the polymer. Generally, amounts of about 3 percent produce excellent results.

After the polymerization and dispersion has been terminated, the bulk of the added organic liquid can be recovered unchanged, for instance by decantation.

The emulsion polymerization can be carried out by known procedures, for instance as set forth in the Swiss Patents Nos. 239,764 and 239,765. According to said method, the polymerization is carried out in an alkaline medium, and the monomer is added in portions, whereby the decrease of the partial pressure of the monomer in the polymerization vessel is used as measure for the addition of further monomer portions. The reaction temperature is adjusted to the desired polymerization degree; generally, it will be between about 30 and 60° C.

The following examples are given to illustrate the method of the invention.

*Example 1*

4,800 g. of water, 20 cc. of 1 N ammonium hydroxide solution in water, 2.5 g. of ammonium persulfate, 3.0 g. of stearic acid are placed in an autoclave of 12 ltr. capacity, and, after displacing the air with vinyl chloride, are agitated by a fork-shaped stirrer rotating with 200 r.p.m. Then, 500 g. of vinyl chloride and subsequently 20 g. of benzine are added. The pressure rises to 7.5 atm. and starts falling after about 40 to 70 minutes. Presently, further 500 g. of vinyl chloride, 2 g. of stearic acid and 8 cc. of 1 N ammonium hydroxide, and subsequently 20 g. of benzine are added. The pressure rises again to its initial value and falls again after 20 minutes. Then, further charges of vinyl chloride, stearic acid and ammonium hydroxide with subsequent addition of benzine are periodically added in the same manner, until the total charge is 6,000 g. of vinyl chloride, 25 g. of stearic acid, and 108 cc. of 1 N ammonium hydroxide. After the last addition, the reaction is continued until the pressure has dropped to 3 atm.; then the gas is allowed to escape and the autoclave is opened. A thin latex with a supernatant benzine layer is obtained. The polymer particles of the latex are visible already with 70×magnification. Their average diameter is about .5 micron. The polymer is recovered from the latex in the conventional manner, for instance by evaporation, precipitation with acids or salts, filtering, washing, drying, grinding and screening.

In comparative tests made under the same conditions but without the addition of benzine, the latex usually breaks already after the sixth addition of vinyl chloride.

The benzine used may have a boiling range of about 30 to 200° C. and should not be discolored by concentrated sulfuric acid. It must be free of impurities which would interfere with the polymerization.

*Example 2*

In a semi-continuous operation of the process, the procedure may be first as set forth in Example 1. At the end of the polymerization, the upper nine tenths of the latex are removed; then 4800 g. of water, 2 g. of ammonium persulfate, 20 cc. of 1 N ammonium hydroxide, 2 g. of stearic acid, and 20 g. of benzine are sluiced in, and the polymerization is continued as described in Example 1. The polymerization starts at once, so that the next portion may be added already after 20 minutes. The addition of the reactants in intervals is continued, as set forth in Example 1, until a total of 5,500 g. of mono vinyl chloride had been introduced. Then part of the latex is again removed, water and the other ingredients are introduced as described above, and the polymerization is continued. This semi-continuous operation has the advantage that the induction period of the polymerization is shortened and polymer particles of somewhat larger diameter, generally of about .8 micron, are obtained. In this semi-continuous operation, always the upper layer of the latex is removed; in this way, the benzine is continually taken out of the reactor and can be recovered to a large extent by decantation. At the same time, it is avoided that more than the desired amount of benzine accumulates in the reactor.

According to the invention, not only analytically but also technically pure vinyl chloride may be converted into aqueous dispersions of the polymer. The novel procedure is also suitable for the preparation of aqueous dispersions of copolymers and mixed polymers from monomeric compositions which contain vinyl chloride as major component, and, in addition, other polymerizable compounds, particularly vinyl type and acrylic compounds containing a single ethylenic bond, such as vinylidene chloride, vinyl acetate, acrylic esters, and the like. Preferably, mixtures should be used which contain, in addition to vinyl chloride, up to about 20 percent of other polymerizable compounds.

I claim:

1. A method of preparing an aqueous dispersion of polyvinyl chloride particles having an average size of at least 0.3 micron, comprising polymerizing vinyl chloride in an aqueous dispersion containing persulfate polymerization catalyst and about 0.1 to not more than 1 part by weight of a fatty acid soap emulsifying agent for 100 parts by weight of vinyl chloride, maintaining during polymerization on top of said dispersion an unemulsified supernatant layer of an organic non-polymerizable and substantially water-incompatible liquid having a lower specific gravity than said aqueous dispersion and the polymer formed therein, and substantially separating said liquid from said dispersion after the polymerization of said vinyl chloride is completed, said organic liquid being applied in an amount of about 1 to 5 percent by weight of the vinyl chloride and being selected from the group consisting of paraffin oil, benzines, ethers, and phthalic esters.

2. The method as defined in claim 1 wherein vinyl chloride and about 0.1 to 20 percent by weight, calculated on the vinyl chloride, of another vinyl compound selected from the group consisting of vinylidene chloride, vinyl acetate, and acrylic esters, are subjected to polymerization.

References Cited in the file of this patent

UNITED STATES PATENTS

| | | |
|---|---|---|
| 2,105,278 | Van der Minnie | Jan. 11, 1938 |
| 2,444,396 | Collins | June 29, 1948 |
| 2,471,743 | Harrison | May 31, 1949 |
| 2,577,280 | Simon et al. | Dec. 4, 1951 |

FOREIGN PATENTS

| | | |
|---|---|---|
| 744,401 | Germany | Jan. 14, 1944 |